UNITED STATES PATENT OFFICE.

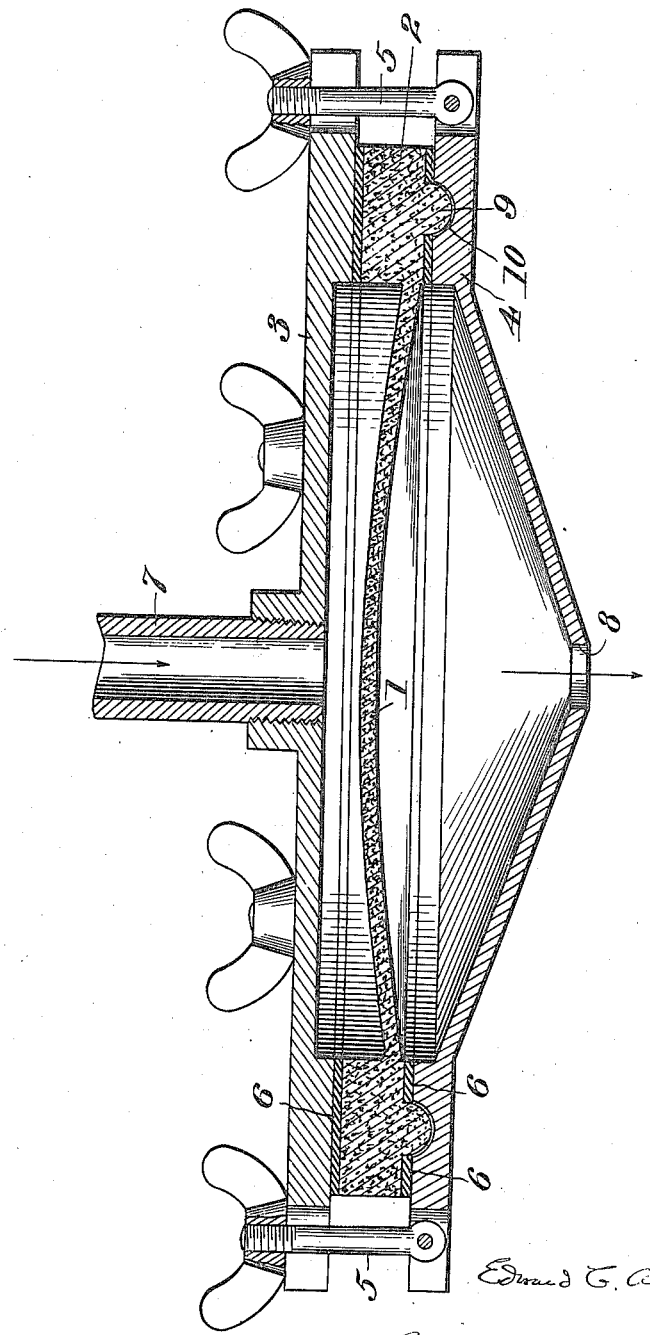

EDWARD G. ACHESON, OF NEW YORK, N. Y., ASSIGNOR TO ACHESON CORPORATION, OF NEW YORK, N. Y., A CORPORATION OF DELAWARE.

FILTRATION OF LIQUIDS.

1,193,334.            Specification of Letters Patent.        Patented Aug. 1, 1916.

Application filed March 3, 1916. Serial No. 81,984.

*To all whom it may concern:*

Be it known that I, EDWARD G. ACHESON, a citizen of the United States, residing at New York, in the county of New York and State of New York, have invented certain new and useful Improvements in the Filtration of Liquids, of which the following is a specification.

This invention relates to filters intended primarily for household use, although applicable to other purposes.

One object of the invention is to provide a simple and inexpensive filter having a very high efficiency in the removal of bacteria from water, as well as in the removal of all suspended or diffused substances therefrom.

The invention comprises the filter and the method of preparing it.

According to the invention, the filtering medium consists of or contains a substance which has, at one stage of its preparation, been "deflocculated," this term being used as in my prior patents and publications to designate the state of extreme subdivision assumed by amorphous bodies, as clay, graphite, etc., when they are kneaded or otherwise appropriately stirred in presence of solutions of certain organic bodies, of which tannin and related compounds, and dextrin or dextrin-like bodies are examples or types.

An illustrative example of a mode of preparing a filtering medium according to the present invention is as follows:—Clay is converted into a paste by means of an aqueous solution of any suitable deflocculating agent, that is to say, an agent having an action thereon similar to that of tannin, and is subjected to a more or less prolonged kneading or mixing operation in a mill. For example, I may add to the clay from 5 to 25 per cent. by weight, more or less, of the deflocculating agent, previously dissolved in sufficient water to convert the clay into a moderately stiff paste. I then subject this paste to continuous kneading for a period of several hours. At the conclusion of this treatment, the clay will be found to be partly deflocculated, the measure of deflocculation being the proportion of the clay which has been rendered permanently suspensible in water. In general, the percentage of deflocculation is greater with the larger percentages of deflocculating agent and with longer time of kneading. The kneading may with advantage be continued until the deflocculating agent is completely fixed in the clay, that is to say, until it cannot be extracted therefrom by water. My invention is not however restricted to the use of any particular deflocculating agent, or to any particular manipulation for accomplishing the deflocculation. The clay thus treated may be immediately pressed or molded into the desired shape, and baked or fired at a temperature sufficient to frit but not to fuse the constituent particles. The firing is carried out under oxidizing conditions whereby all organic matter is burned out. Complete deflocculation is not usually necessary, inasmuch as the exceedingly minute (deflocculated) particles, if present in sufficient proportion, will so fill the interstices between the larger particles as to reduce the porosity of the filter to the degree desired. For some purposes, however, complete or substantially complete deflocculation is desirable, and in such cases the deflocculated portions may be isolated in known manner by suspending the clay, after treatment as above, in water, removing the coarser particles by subsidence, and collecting the deflocculated material in the form of a paste upon a suitable filter. This paste may then be molded into shape, dried and fired or baked as above described.

Filtering media prepared by either of the above described methods possess certain remarkable advantages for the purpose stated. Owing to the extreme subdivision of a sufficient portion or of all of the clay particles, the interstices are so minute that the filtering member or septum, even when very thin, is quite impenetrable to bacteria, with the result that infected water is rendered completely sterile by passage therethrough. Moreover, the deflocculation reduces the shrinkage of the clay during baking, and greatly increases the hardness of the baked article, so that the septa or other forms are mechanically strong and the filtering surface is quite free from cracks or fissures. Its impenetrability to bacteria is such that there is little or no liability of such organisms finding lodgment in the interior portions, and the hard and smooth surface is very readily and thoroughly cleaned by scrubbing, scalding or other treatment. The resulting article may be sterilized by baking if desired after a period of use.

The present invention is not restricted to any particular form or construction of filter, as these may be molded or otherwise formed into tubes, disks, hollow bodies, sheets or other forms as may be desired. A preferred form however is that claimed in my co-pending application Serial No. 81,983, filed March 3, 1916, and illustrated in the accompanying drawing, in which the figure is a central vertical section of a filter element with its mounting.

The filtering member proper, in the embodiment of the invention chosen for illustration, comprises a relatively thin and preferably slightly arched septum 1 of a suitable porous material, having formed integral therewith an encircling ring or flange 2, hereinafter referred to as the "bearing member." As shown, this bearing member is of such depth that the septum 1 is entirely comprised between its upper and lower planes. The bearing member therefore serves as a protection for the more fragile septum in every position, and moreover, the filter members can be safely stacked for storage or transportation. The bearing member 2 is preferably of the same permeable material as the septum 1, but is of such dimensions that the passage of water to its periphery under conditions of use is negligible. If desired, the bearing member 2, or portions of it, may be rendered impermeable to water, as by impregnation with paraffin or other suitable material.

The mounting illustrated comprises upper and lower members 3 and 4, preferably of cast iron or other metal, and adapted to be clamped upon the upper and lower bearing planes of the ring 2 by peripheral bolts 5 or equivalent elements. Gaskets 6 may be used to prevent leakage and to avoid danger of fracturing the bearing member, although these may be unnecessary when the bearing surfaces are true planes. The upper member 3 is attached to the source of water-supply under pressure, the water entering through pipe 7, while the filtered water escapes through the orifice 8. It will be observed that the pressure of the water is exerted against the convex side of the arched septum 1, so that the latter may be made very thin while yet capable of withstanding very considerable pressures.

In order that the position of the filter member may not be accidentally reversed when replacing it in the mounting, I prefer to provide on one of its surfaces an annular rib 9, engaging a corresponding groove 10 in one of the elements of the mounting, the construction serving also to center the filter member. Of course any other means for making the position of the filter member irreversible may be used, or such means may be dispensed with.

I claim:—

1. As a new article of manufacture, a filtering medium, constituent particles of which have been subjected to a process of deflocculation followed by baking.

2. The method of making a filtering medium which consists in subjecting a finely-divided amorphous substance to a process of deflocculation, forming the resulting mass into the desired shape, and baking the article.

3. The method of making a filtering medium which consists in stirring or kneading clay in presence of a deflocculating agent, shaping the resulting mass, and baking the article.

In testimony whereof I affix my signature.

EDWARD G. ACHESON.